(12) United States Patent
Tanaka

(10) Patent No.: US 6,345,270 B1
(45) Date of Patent: *Feb. 5, 2002

(54) DATA MANAGEMENT SYSTEM

(75) Inventor: Hitokazu Tanaka, Kasugai (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,996

(22) Filed: Mar. 19, 1998

(30) Foreign Application Priority Data

May 26, 1997 (JP) .............................................. 9-134815

(51) Int. Cl.$^7$ ........................... G06F 17/30; G06F 12/00
(52) U.S. Cl. .................... 707/4; 707/3; 707/6; 707/200
(58) Field of Search ........................... 707/6, 3, 1, 102, 707/4, 103, 200

(56) References Cited

U.S. PATENT DOCUMENTS

| | | | | |
|---|---|---|---|---|
| 3,670,310 A | * | 6/1972 | Bharwani et al. ............... | 707/3 |
| 4,817,036 A | * | 3/1989 | Millet et al. .................... | 707/3 |
| 5,020,019 A | * | 5/1991 | Ogawa ........................... | 707/3 |
| 5,845,273 A | * | 12/1998 | Jindal ............................. | 707/1 |
| 5,878,425 A | * | 3/1999 | Redpath ...................... | 707/102 |
| 5,890,152 A | * | 3/1999 | Rapaport et al. ............... | 707/6 |

FOREIGN PATENT DOCUMENTS

| | | |
|---|---|---|
| JP | 63-249267 | 10/1988 |
| JP | 4-131944 | 5/1992 |

* cited by examiner

*Primary Examiner*—Frantz Coby
(74) *Attorney, Agent, or Firm*—Staas & Halsey LLP

(57) ABSTRACT

A data management system allows various forms of data to be centrally managed. The system includes a first storage unit for storing different types of data files, each including a keyword. A second storage unit stores the keywords associated with the different types of data files. A third storage unit stores location information of the individual keywords. When an arithmetic unit receives a keyword, it updates the keyword in the first storage unit based on the location information in the third storage unit.

11 Claims, 4 Drawing Sheets

| | | |
|---|---|---|
| KEYWORD K1 | DEVELOPMENT RESOURCE S1 | UPDATED |
| | DEVELOPMENT RESOURCE S3 | UPDATED |
| KEYWORD K2 | DEVELOPMENT RESOURCE S2 | UPDATED |
| KEYWORD K3 | DEVELOPMENT RESOURCE S1 | NOT UPDATED |
| | DEVELOPMENT RESOURCE S2 | UPDATED |
| | DEVELOPMENT RESOURCE S4 | UPDATED |
| KEYWORD K4 | DEVELOPMENT RESOURCE S3 | NOT UPDATED |
| | DEVELOPMENT RESOURCE S4 | UPDATED |
| | DEVELOPMENT RESOURCE S8 | NOT UPDATED |
| KEYWORD K5 | DEVELOPMENT RESOURCE S2 | UPDATED |
| | DEVELOPMENT RESOURCE S5 | UPDATED |
| KEYWORD K6 | DEVELOPMENT RESOURCE S1 | UPDATED |
| | DEVELOPMENT RESOURCE S6 | UPDATED |
| | DEVELOPMENT RESOURCE S9 | NOT UPDATED |
| KEYWORD K7 | DEVELOPMENT RESOURCE S7 | UPDATED |

Fig.4

| | | /8 |
|---|---|---|
| KEYWORD K1 | DEVELOPMENT RESOURCE S1 | UPDATED |
| | DEVELOPMENT RESOURCE S3 | UPDATED |
| KEYWORD K2 | DEVELOPMENT RESOURCE S2 | UPDATED |
| KEYWORD K3 | DEVELOPMENT RESOURCE S1 | NOT UPDATED |
| | DEVELOPMENT RESOURCE S2 | UPDATED |
| | DEVELOPMENT RESOURCE S4 | UPDATED |
| KEYWORD K4 | DEVELOPMENT RESOURCE S3 | NOT UPDATED |
| | DEVELOPMENT RESOURCE S4 | UPDATED |
| | DEVELOPMENT RESOURCE S8 | NOT UPDATED |
| KEYWORD K5 | DEVELOPMENT RESOURCE S2 | UPDATED |
| | DEVELOPMENT RESOURCE S5 | UPDATED |
| KEYWORD K6 | DEVELOPMENT RESOURCE S1 | UPDATED |
| | DEVELOPMENT RESOURCE S6 | UPDATED |
| | DEVELOPMENT RESOURCE S9 | NOT UPDATED |
| KEYWORD K7 | DEVELOPMENT RESOURCE S7 | UPDATED |
| ⋮ | ⋮ | ⋮ |

DATA MANAGEMENT SYSTEM

BACKGROUND OF THE INVENTION

The present invention relates to a data management system which stores and manages data using a computer system.

In various kinds of businesses, large amounts of data are produced in developing, designing and manufacturing products. In order to effectively utilize such data as a development resource, it is necessary to efficiently store and manage the data.

For example, for a semiconductor device, various steps are required including a developing step, a designing step, a manufacturing step and a testing step. In the steps, operations are performed using operating tools including independent computer systems.

A data management system manages various data produced by the operating tools as development resources. In particular, data of various forms produced by different operating tools are stored once into the individual operating tools, and in order to allow re-utilization of the data, the data are registered and stored as development resources into a management tool including a management computer system.

The individual tools are located at different places from one another, and are different from one another in operation data type and form. The data stored by such operating tools are manually extracted from the operating tools into recording media, and the recording media are transported to the management tool. The management tool reads the recorded contents of the recording media and registers and stores the data as development resources.

To the individual development resources, arbitrary keywords are set. Each keyword includes numerical value information set in a corresponding relationship to, for example, a particular word, and when a development resource is re-utilized, the keywords in the development resources are identified as corresponding numerical information.

Updating of the individual keywords is performed by updating the numerical value information corresponding to the keywords of each group of the development resources of the same types produced by the individual working tools.

The data management system registers the data produced by the individual operating tools as development resources into the management tool by manual operation of an operator. Accordingly, the registration operation is complicated, and there is the possibility that omission in registration may occur.

Further, for each group of development resources of the same type, information corresponding to the arbitrary keyword is updated collectively using the management tool. However, it is impossible to collectively update a common keyword in the development resources of different types. Therefore, it is necessary to retrieve various development resources registered in the management tool to extract a keyword which is present in development resources of a same type and collectively update the extracted keyword.

Accordingly, since updating operation of a keyword must be performed for each group of development resources of the same type, the operation is complicated, and there is the possibility of omission in updating for a common keyword between development resources of different types.

Further, the updating operation is performed also for the keywords of a group of development resources which do not require updating. Therefore, updating of a keyword is performed individually for each development resource. In this case, there is a problem in that a large number of development resources may have different updating histories, making management of the updating operation complicated.

It is an object of the present invention to provide a data management system which readily and accurately updates and manages keywords included in a large number of development resources of different types.

SUMMARY OF THE INVENTION

Briefly stated, the present invention provides a data management system including: a data input unit for inputting input data; an operation unit connected to the data input unit for performing a predetermined operation using the input data to produce a plurality of different type data files, each including a keyword; a first storage unit for storing the plurality of different type data files; a second storage unit for storing the keywords of the plurality of data files; a third storage unit for storing location information of the individual keywords included in the individual data files; and an arithmetic unit for receiving a keyword from said second storage unit and updating the keyword included in the plurality of different type data files based on the location information stored in said third storage unit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a diagrammatic view showing an updating management table produced by the data management system of FIG. 2.

DETAILED DESCRIPTION OF THE PREFERRED EMBODIMENTS

Figure 1:
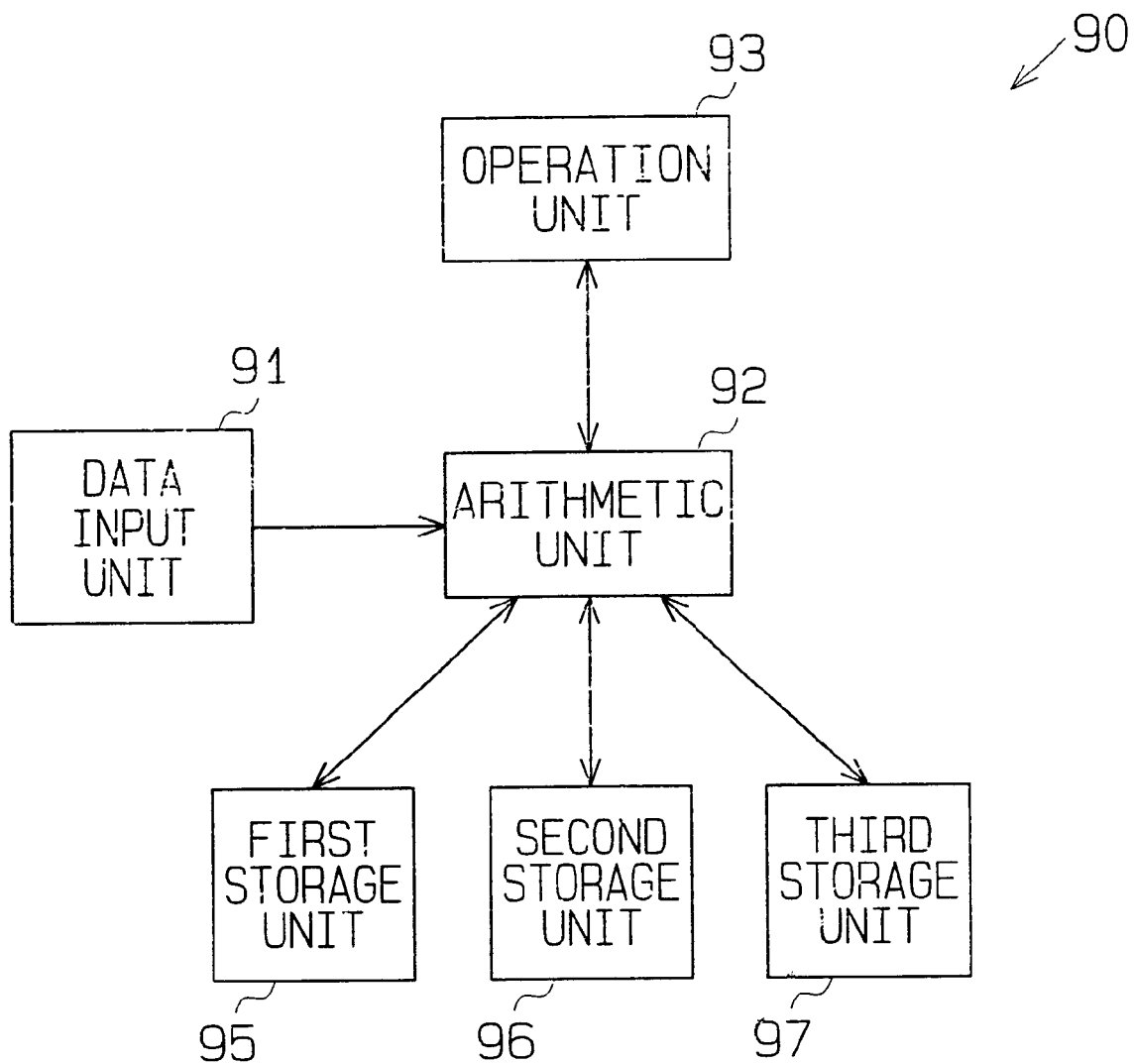
FIG. 1 is a block diagram showing a general construction of a data management system of the present invention.

FIG. 1 is a block diagram showing a general construction of a data management system 90 of the present invention. A data input unit 91 is provided for entering data into the system 90. The data input unit 91 may comprise a computer terminal, a personal computer or other interface device which allows an operator to communicate with another computer or processor. The data input unit 91 preferably includes an input device, such as keyboard, mouse, or microphone and a display device, such as a CRT or LCD. An operation unit 93 performs predetermined operations using the input data to produce data files. A first storage unit 95 stores a plurality of different types of data files produced by the operation of the operation unit 93. A second storage unit 96 stores a plurality of keywords set for the plurality of data files. A third storage unit 97 stores location information of the keywords included in the data files. An arithmetic unit 92 substantially simultaneously updates a keyword included in a plurality of different type data files based on the location information stored in the third storage unit 97. The first, second and third storage units 95–97 may comprises various separate storage devices of various types, such as RAM or disk, or a single storage device.

Figure 2:
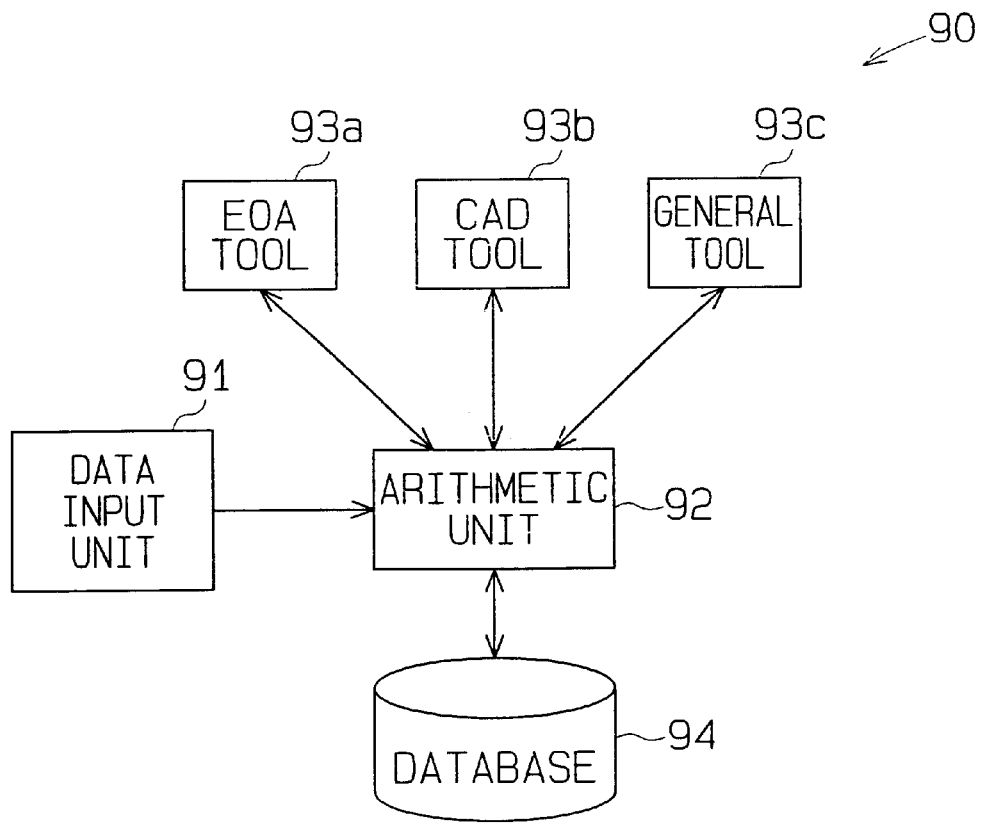
FIG. 2 is a more detailed block diagram of the data management system of FIG. 1.

FIG. 2 is a more detailed block diagram of the data management system 90 of the present invention. The data management system 90 includes the data input unit 91, the arithmetic unit 92, an EOA tool 93a, a CAD (Computer Aided Design) tool 93b and a general tool 93c. The EOA tool 93a, CAD tool 93b and general tool 93c form the operation unit 93. The first to-third storage regions 5, 6 and 7 are formed in a database 94.

The data input unit 91 inputs data and displays data and keywords, and is connected to the arithmetic unit 92. The arithmetic unit 92 operates in accordance with an operation control signal input from the data input unit 91 and a predetermined program stored within or accessible by the arithmetic unit 92.

The arithmetic unit 92 is connected to the EOA tool 93a for performing documentation by a designing operation, a CAD tool 93b for performing composition of a drawing and a general tool 93c. The arithmetic unit 92 transfers data input from the data input unit 91 to a predetermined one of the tools 93a to 93c.

The arithmetic unit 92 is connected to the database 94. In the database 94, data necessary for operation by the tools 93a to 93c are stored. The data are extracted from the database 94 by the arithmetic unit 92 and supplied to the tools 93a to 93c.

Figure 3:
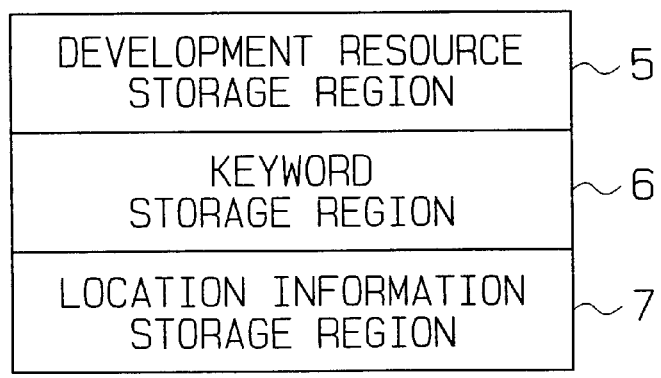
FIG. 3 is a diagrammatic view illustrating storage regions of a database in the data management system of FIG. 2.

The arithmetic unit 92 stores development resources (data files) produced by operation of the tools 93a to 93c in the database 94. As shown in FIG. 3, the database 94 includes a development resource storage region 5 into which the development resources are stored, a keyword storage region 6 into which all of the keywords set for the individual development resources are stored, and a location information storage region 7 into which location information of the individual keywords are stored.

When updating of a keyword is set by the data input unit 91, then the arithmetic unit 92 produces an updating management table 8 as shown in FIG. 4 based on the development resources, keywords and location information stored in the storage regions 5, 6 and 7 and displays the updating management table 8 on a display unit of the data input unit 91.

The updating management table 8 includes a keyword display region, a display region of development resources for each keyword and an updating information display region for displaying whether or not updating of the keyword included in the individual development resources has been completed.

Figure 5:
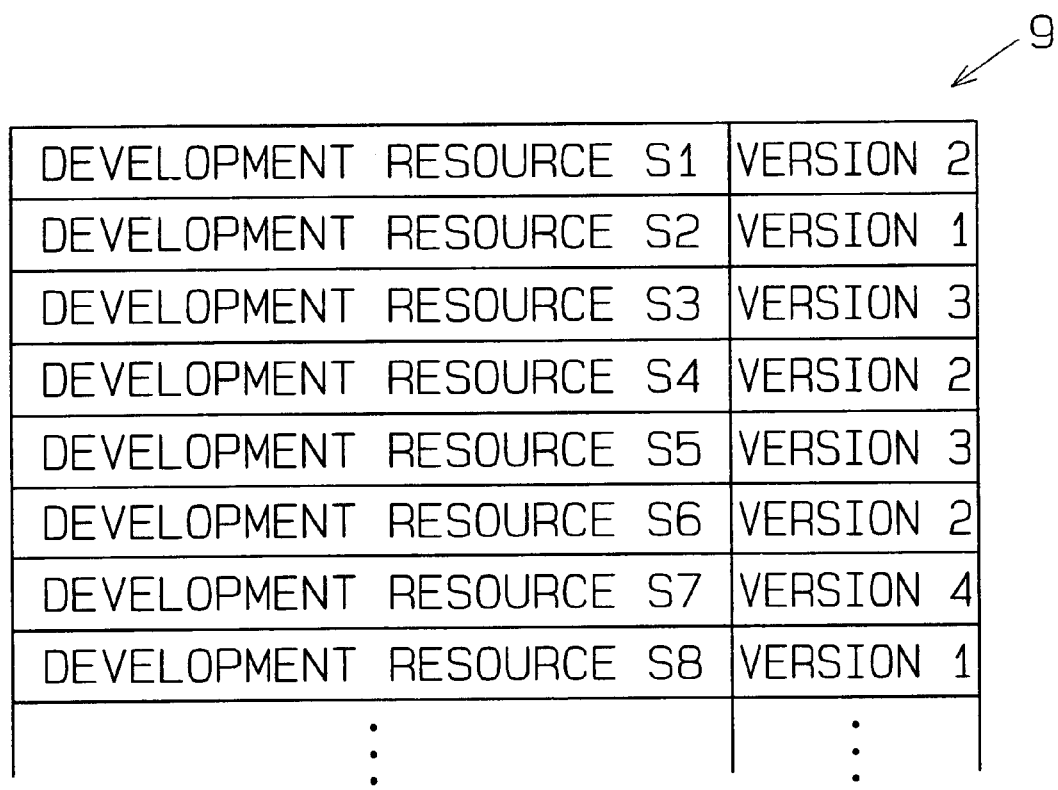
FIG. 5 is a diagrammatic view showing a version number table produced by the data management system of FIG. 2.

Then, the arithmetic unit 92 performs collective or partial updating of the keyword in response to an operation control signal input thereto from the data input unit 91 and displays a result of the updating in the predetermined region of the updating management table 8. Further, as shown in FIG. 5, version numbers representative of the number of times of updating operations of the individual keywords included in the individual development resources are maintained for the individual development resources in a version number table 9.

The development resources stored in the database 94 are transferred to an Internet tool through the arithmetic unit 92 so that they may be distributed to relevant divisions by the Internet tool or may be transferred to another division on-line.

Operation of the data management system 90 will be described. The arithmetic unit 92 supplies required data from the database 94 to the tools 93a to 93c in response to a control signal input thereto from the data input unit 91.

A plurality of development resources produced by the operation of the tools 93a to 93c are stored into the database 94. At this time, as shown in FIG. 3, the development resources, all of the keywords set to the development resources, and location information of the individual keywords included in development resources are stored into the storage regions 5, 6 and 7 of the database 94, respectively.

When an updating requesting signal is input from the data input unit 91 to the arithmetic unit 92 in order to perform updating of a keyword, then the arithmetic unit 92 produces the updating management table 8 based on the keywords and the location information of the keywords stored in the database 94 and displays the updating management table 8 on the display unit of the data input unit 91.

Then, the arithmetic unit 92 requests, on the updating management table 8, for inputting of a target keyword for updating and updating information corresponding to the target keyword and requests for selection of whether or not collective updating should be performed.

For example, when collective updating of a keyword K1 included in the development resources S1 and S3 is selected, then the keyword K1 in the development resources S1 and S3 is updated collectively, and the updating information corresponding to the development resources S1 and S3 associated with the updated keyword K1 is changed to "updated".

Further, the version numbers of the updated development resources S1 and S3 are updated. For example, as seen in FIG. 5, the version number of the development resource S1 is updated to 2 while the version number of the development resource S3 is updated to 3.

On the other hand, when partial updating of a keyword K3 included in the development resources S2 and S4 is selected and then the development resources S2 and S4 are selected on the updating management table 8, then, the keyword K3 in the development resources S2 and S4 is updated as seen in FIG. 4.

The updating information corresponding to the development resources S2 and S4 associated with the Keyword K3 is set to "updated", and the updating information corresponding to the development resource S1 is set to "not updated". Then, the version numbers of the development resources S2 and S4 are updated.

Further, the development resources whose keywords have not been updated are displayed in a list for the individual keywords, and the keywords which have not been updated are displayed in a list for the individual development resources to urge an operator to confirm omission of updating.

The data management system 90 of the present invention has the following advantages:

(a) Since a large number of keywords set in a large number of development resources and location information of the keywords are stored in the database 94, if collective updating of a desired keyword is selected, then the keyword included in all of the development resources is updated collectively;

(b) When partial updating of a desired keyword is selected, it is possible to select those development resources which include the keyword to be updated, and the keyword in the selected development resources is updated;

(c) Since the information whether or not each keyword has been updated in a large number of development resources is stored into the updating management table 8 and displayed, an operator readily recognizes whether or not each keyword has been updated. Further, the operator readily recognizes whether or not keywords in each development resource have been updated;

(d) Since, upon updating of a keyword, the version numbers representing numbers of times of updating of those development resources in which the keyword is included are updated automatically, the operator readily recognizes a result of the updating of the development resources;

(e) Since, from among the keywords included in the individual development resources, those keywords which have not been updated are displayed in a list, confirmation of omission of updating is readily performed; and (f) Since those of a large number of development resources which include a keyword which has not been updated are displayed in a list, confirmation of omission of updating is performed readily.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A data management system, comprising:
    a data input unit inputting data;
    an operation unit connected to the data input unit and executing software tools performing a predetermined operation using the input data to produce data files having different formats, each data file including information represented by a keyword, wherein at least two of the data files include a common keyword;
    a first storage unit storing the data files;
    a second storage unit storing the keywords of data files;
    a third storage unit storing location information indicating the data files including the keywords; and
    an arithmetic unit in communication with the operation unit, in communication with the first, second and third storage units and in communication with the data input unit, and executing a management software tool receiving a keyword and update information corresponding to the keyword and updating the data files by using the update information to update in the data files information corresponding to the keyword, including updating the data files that commonly include the keyword, using the location information of the keyword.

2. The data management system according to claim 1, wherein said arithmetic unit selectively performs one of collective updating and partial updating in response to the input data, wherein in collective updating, common keywords included in the data files are collectively updated, and in partial updating, a portion of the common keywords are updated.

3. The data management system according to claim 1, wherein said arithmetic unit produces an updating management table including a relationship between the keywords and the data files and updating information representative of whether or not the keywords in the data files have been updated, the data files and the location information.

4. The data management system according to claim 3, wherein said first to third storage units are formed in a database and said arithmetic unit stores the updating management table in the database.

5. The data management system according to claim 4, wherein said arithmetic unit produces a version number table indicating numbers of times of updating of keywords and stores the version number table into said database.

6. The data management system according to claim 1, wherein said data input unit includes a display unit, and said arithmetic unit displays not updated keywords and data files including the not updated keywords on said display unit.

7. A method to manage data produced by computer systems, which execute software tools, comprising:
    producing data files having different formats by executing the software tools, each data file including information represented by a keyword, at least two of the data files including a common keyword;
    storing the data files, the keywords and location information indicating the data files including the keywords;
    updating the data files by receiving a keyword and update information corresponding to the keyword and updating the data files by using the update information to update in the data files information corresponding to the keyword, including updating the data files that commonly include the keyword, using the location information of the keyword.

8. A method according to claim 7, wherein said updating further comprises selectively performing one of collective updating and partial updating in response to input data, wherein in collective updating, common keywords included in the data files are collectively updated, and in partial updating, a portion of the common keywords are updated.

9. A system managing data produced by computer systems executing software tools, comprising:
    computer systems executing software tools producing data files having different formats, each data file including information represented by a keyword and at least two of the data files including a common keyword;
    a storage unit in communication with the computer systems and storing the data files, the keywords and location information indicating the data files including the keywords;
    a managing computer system in communication with the computer systems and the storage unit, and executing a management software tool receiving a keyword and update information corresponding to the keyword and updating the data files by using the update information to update in the data files information corresponding to the keyword, including updating the data files that commonly include the keyword, using the location information of the keyword.

10. A data management system in communication with a data input unit, a storage unit and computer systems, each computer system executing software tools producing data files having different format, each data file including information represented by at least one keyword and at least two of the data files including a common keyword, the data management system comprising
    a processor, to store in the storage unit the data files, the keywords and location information indicating the data files including the keywords, to receive a keyword and update information corresponding to the keywords, and to update the data files by using the update information to update in the data files information corresponding to the keywords, including updating the data files that commonly include the keywords, using the location information of the keywords.

11. A data management system, comprising:

a data input unit inputting data;

an operation unit connected to the data input unit and executing software tools performing a predetermined operation using the input data to produce data files having different formats, each data file including a keyword, wherein at least two of the data files include a common keyword;

a first storage unit storing the data files;

a second storage unit storing the keywords of data files;

a third storage unit storing location information indicating the data files including the keywords; and an arithmetic unit in communication with the operation unit, in communication with the first, second and third storage units and in communication with the data input unit, and executing a management software tool receiving a keyword and update information corresponding to the keyword and using the update information to update in the data files information corresponding to the keyword, including updating the data files that commonly include the keyword, using the location information of the keyword, wherein the arithmetic unit displays the data files whose keywords have been updated and have not been updated in a table of the keywords and corresponding data files including the information corresponding to the keywords to urge an operator to confirm omission of updating or submission of updating.

* * * * *